US012632659B2

(12) United States Patent
Enomoto et al.

(10) Patent No.: US 12,632,659 B2
(45) Date of Patent: May 19, 2026

(54) EXPLAINABLE AND EFFICIENT TEXT SUMMARIZATION

(71) Applicant: NEC Corporation, Tokyo (JP)

(72) Inventors: Masafumi Enomoto, Tokyo (JP); Kunihiro Takeoka, Tokyo (JP); Kiril Gashteovski, Heidelberg (DE); Carolin Lawrence, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 18/374,676

(22) Filed: Sep. 29, 2023

(65) Prior Publication Data

US 2025/0045525 A1     Feb. 6, 2025

Related U.S. Application Data

(60) Provisional application No. 63/522,470, filed on Jun. 22, 2023.

(51) Int. Cl.
G06F 40/289          (2020.01)

(52) U.S. Cl.
CPC .................................. G06F 40/289 (2020.01)

(58) Field of Classification Search
None
See application file for complete search history.

(56) References Cited

U.S. PATENT DOCUMENTS 11,397,892 B2 *   7/2022   Subramanian ......... G06N 3/044
11,443,538 B2     9/2022   Manchanda et al.
11,574,022 B2     2/2023   Trim et al.
                  (Continued)

FOREIGN PATENT DOCUMENTS

CN          110399477 A      11/2019
IN       2019/41053791 A      6/2021
WO    WO 2021/234610 A1      11/2021

OTHER PUBLICATIONS

Gao et al. "SUPERT: Towards New Frontiers in Unsupervised Evaluation Metrics for Multi-Document Summarization". arXiv: 2005.03724v1 [cs.CL] May 7, 2020 (Year: 2020).*
                  (Continued)

*Primary Examiner* — Jesse S Pullias
(74) *Attorney, Agent, or Firm* — Sughrue Mion, PLLC

(57)          ABSTRACT
A computer-implemented, machine learning method for generating explainable text summaries includes extracting a subset of sentences from an input document as an extractive summary and adding context to the extracted sentences to generate a prompt. A fluent summary is generated by using the prompt as input to a generative language model. Source information for a sentence from the fluent summary is determined by mapping the sentence from the fluent summary to a sentence in the extractive summary and the sentence from the extractive summary to a sentence from the input document. A transparent summary view is generated showing the sentence from the fluent summary along with the source information from the extractive summary and the input document for display on a user interface. The method has applications including, but not limited to medical AI, public safety and other machine learning applications for reliable and explainable document summarization.

14 Claims, 7 Drawing Sheets

(e) Transparent summary view                                    425

(d) Fluent summary      Each sentence in the fluent summary

Dozens of fruit growers arrested in Spain over ...

(b) Extractive summary
                  Evidence text in extractive summary (a) Input
document1   Evidence text in input documents document2 document3

(56) References Cited

U.S. PATENT DOCUMENTS

| | | | |
|---|---|---|---|
| 2012/0137202 A1* | 5/2012 | Nelson | G06F 16/9566 |
| | | | 715/205 |
| 2018/0160200 A1 | 6/2018 | Goel et al. | |
| 2020/0004803 A1* | 1/2020 | Dernoncourt | G10L 15/26 |
| 2020/0142917 A1* | 5/2020 | Paulus | G06N 3/044 |
| 2020/0167391 A1* | 5/2020 | Zheng | G06F 16/3347 |
| 2021/0089622 A1* | 3/2021 | Ng | G06F 40/289 |
| 2021/0124876 A1 | 4/2021 | Kryscinski et al. | |
| 2021/0133224 A1* | 5/2021 | Tiwari | G06F 16/319 |
| 2022/0044199 A1* | 2/2022 | Pati | G06Q 40/02 |
| 2022/0108086 A1* | 4/2022 | Wu | G06F 40/35 |
| 2022/0129636 A1 | 4/2022 | Baughman et al. | |
| 2022/0293267 A1 | 9/2022 | Kumar Karn et al. | |
| 2022/0374584 A1 | 11/2022 | Kumar Karn et al. | |
| 2022/0375605 A1* | 11/2022 | Lipton | G06F 40/30 |
| 2022/0414319 A1* | 12/2022 | De Oliveira | G06F 40/284 |
| 2023/0054068 A1 | 2/2023 | Zheng et al. | |
| 2023/0119109 A1 | 4/2023 | Choubey et al. | |
| 2023/0122609 A1 | 4/2023 | Mukherjee | |
| 2024/0370661 A1* | 11/2024 | Hirshberg | G06F 40/40 |
| 2024/0371367 A1* | 11/2024 | Churgin | H04M 3/5175 |

OTHER PUBLICATIONS

Bouscarrat et al. "STRASS: A Light and Effective Method for Extractive Summarization Based on Sentence Embeddings". arXiv: 1907.07323v1 [cs.CL] Jul. 16, 2019 (Year: 2019).*

Abolghasemi, Majid et al.; "HTS-DL: Hybrid Text Summarization System using Deep Learning"; *2022 27th International Computer Conference, Computer Society of Iran (CSICC)*; May 27, 2022; pp. 1-5; IEEE; Piscataway, NJ, USA.

Cao, Meng et al.; "Learning with Rejection for Abstractive Text Summarization"; *Proceedings of the 2022 Conference on Empirical Methods in Natural Language Processing;* Dec. 7, 2022; pp. 9768-9780; Association for Computational Linguistics, MIT Press; Cambridge, MA, USA.

Choi, Eunsol et al.; "Decontextualization: Making Sentences Stand-Alone"; *Transactions of the Association for Computational Linguistics;* Feb. 9, 2021; pp. 447-461; vol. 9; ArXiv.org, Cornell University; Ithaca, NY, USA.

Hsu, Wan-Ting et al.; "A Unified Model for Extractive and Abstractive Summarization using Inconsistency Loss"; *Proceedings of the 56th Annual Meeting of the Association for Computational Linguistics (Long Papers);* Jul. 5, 2018; pp. 132-141; vol. 2; Association for Computational Linguistics, MIT Press; Cambridge, MA, USA.

Ma, Edward; "Summarize document by combing extractive and abstractive steps"; DataSeries; Oct. 2, 2019; pp. 1-4 (Abstract); [Online] Retrieved from Internet: https://medium.com/dataseries/summarize-document-by-combing-extractive-and-abstractive-steps-40295310526; Medium, A Medium Corporation; San Francisco, CA, USA.

Norkute, Milda et al.; "Towards Explainable AI: Assessing the Usefulness and Impact of Added Explainability Features in Legal Document Summarization"; *Extended Abstracts of the 2021 CHI Conference on Human Factors in Computing Systems;* May 8, 2021; pp. 1-7; Art. 53; ACM Publications; New York, NY, USA.

See, Abigail et al.; "Get To The Point: Summarization with Pointer-Generator Networks"; *Stanford NLP Group: Topics in Natural Language Processing;* Apr. 25, 2017; pp. 1-20; vol. 2; ArXiv.org, Cornell University; Ithaca, NY, USA.

Tretyak, Vladislav et al.; "Combination of abstractive and extractive approaches for summarization of long scientific texts"; *Proceedings of the 23rd International Conference on Discovery Science;* Jun. 12, 2020; pp. 1-11; vol. 2; ArXiv.org, Cornell University; Ithaca, NY, USA.

Varade, Saurabh et al.; "Text Summarization using Extractive and Abstractive Methods"; *Proceedings of the 10th International Conference on Advances in Computing and Communications 2021 (ICACC-2021);* Oct. 21, 2021; pp. 1-5; vol. 40, No. 03023; ITM Web of Conferences, EDP Sciences; Les Ulis, France.

Wang, Shuai et al.; "Integrating Extractive and Abstractive Models for Long Text Summarization"; *2017 IEEE International Congress on Big Data;* Sep. 11, 2017; pp. 1-2 (Abstract); IEEE; Piscataway, NJ, USA.

Wei, Ran et al.; "Sharing Pre-trained BERT Decoder for a Hybrid Summarization"; *China National Conference on Chinese Computational Linguistics—Lectures Notes in Computer Science;* Oct. 13, 2019; pp. 169-180; vol. 11856; Springer Nature Switzerland AG; Basel, Switzerland.

Wu, Yuxiang et al.; "Learning to Extract Coherent Summary via Deep Reinforcement Learning"; *2018 Association for the Advancement of Artificial Intelligence;* Apr. 19, 2018; pp. 1-8; vol. 1; ArXiv.org, Cornell University; Ithaca, NY, USA.

Zhang, Haopeng et al.; "Extractive Summarization via ChatGPT for Faithful Summary Generation"; *Findings of the 2023 Conference on Empirical Methods in Natural Language Processing;* Apr. 9, 2023; pp. 1-8; vol. 1; ArXiv.org, Cornell University; Ithaca, NY, USA.

International Search Report for PCT Application No. PCT/JP2024/022636, mailed on Aug. 13, 2024.

Written opinion for PCT Application No. PCT/JP2024/022636, mailed on Aug. 13, 2024.

* cited by examiner

700

702 Processor(s)

704 Memory

706 I/O

708 Sensor(s)

710 UI(s)

712 Actuator(s)

EXPLAINABLE AND EFFICIENT TEXT SUMMARIZATION

CROSS-REFERENCE TO PRIOR APPLICATION

Priority is claimed to U.S. Provisional Application No. 63/522,470 filed on Jun. 22, 2023, which is hereby incorporated by reference herein.

FIELD

The present invention relates to Artificial Intelligence (AI) and machine learning, and, in particular, to a method, system and computer-readable medium for explainable and efficient text summarization.

BACKGROUND

Large Language Models (LLMs), such as ChatGPT, exhibit strong performance on many Natural Language Processing (NLP) tasks, including text summarization. Within the generated summary, however, such generative LLMs can generate information that could be false. In particular, the generated text can contain factually incorrect information, referred to also as hallucinations of fact, that at the same time appears to be stated with confidence, thereby resulting in a lack of trust and reliability of LLM systems, in addition to making their use dangerous in a number of higher risk scenarios. Moreover, the use of such LLM systems is inefficient, in terms of computational resources and compute time.

SUMMARY

In an embodiment, the present invention provides a computer-implemented, machine learning method for generating explainable text summaries. A subset of sentences are extracted from at least one input document as an extractive summary. Context is added to the extracted sentences to generate a prompt. A fluent summary is generated by using the prompt as input to a generative language model. Source information for a sentence from the fluent summary is determined by mapping the sentence from the fluent summary to at least one sentence in the extractive summary and the at least one sentence from the extractive summary to at least one sentence from the at least one input document. A transparent summary view is generated showing the sentence from the fluent summary along with the source information from the extractive summary and the at least one input document for display on a user interface. The method has applications including, but not limited to medical AI, public safety and other machine learning applications for reliable and explainable document summarization.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
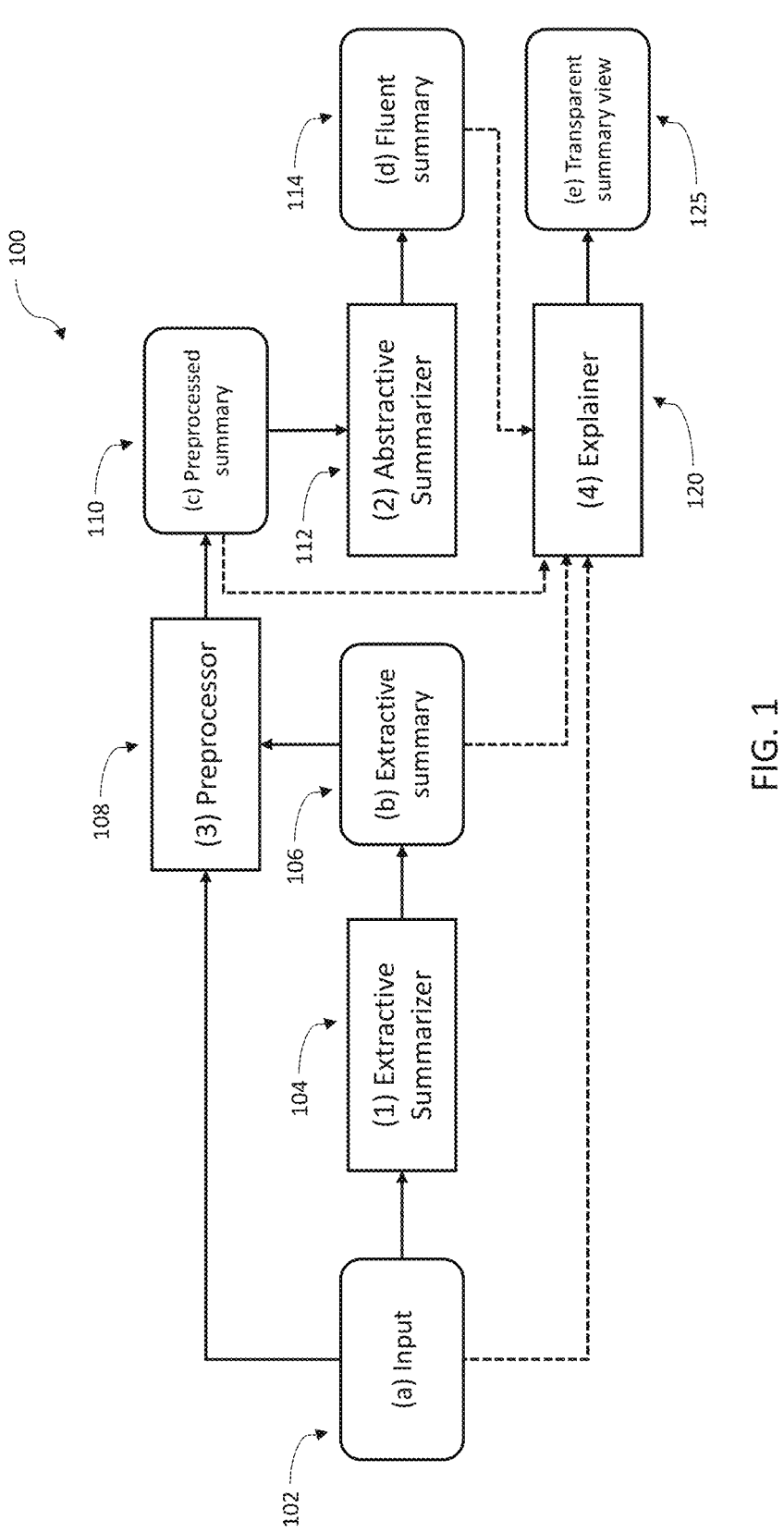
FIG. 1 schematically illustrates a method and overall system architecture for generating text summaries in accordance with an embodiment of the present invention.

Embodiments of the invention provide to make the use of LLMs more trustworthy, secure, reliable and efficient, in terms of required computation resources and/or compute time, for summarization by modifying the input in a transparent and explainable manner. At the same time, embodiments of the present invention provide to significantly reduce the costs of LLM by reducing the size of input documents are before they are given to the LLM, therefore shortening the input lengths and thus enabling to reduce the computational load, in terms of required computational resources and/or compute time. This, in turn, enables to free up computational resources for other tasks, such as other incoming queries, and allows for the processing of an increased amount of queries in a secure, reliable and trustworthy manner.

According to existing technology, LLM systems suffer from the technical deficiency of hallucinating facts and can generate wrong information in the summary (i.e., factually incorrect information with respect to the information contained within the original document). This is especially dangerous for high risk applications and use cases. For example, if a doctor makes a decision for a patient based on a summary that was obtained automatically from an LLM, and the summary contains false information, then the doctor could make the wrong decision based on the false information and risk the patient's life. For example, an LLM could generate a summary that contains factually incorrect information that the patient doesn't smoke when the original document states that the patient does smoke. In such a case, the doctor might not realize that the cause of a symptom might be smoking. Embodiments of the present invention provide to improve such LLM systems by mitigating hallucinations of fact and improving the factual accuracy of summaries, thereby also improving the reliability and trustworthiness of the LLM systems.

Also, according to existing technology, querying an LLM system is expensive in terms of computational resources and compute time because it is highly computationally intensive. For example, in the case of a call center, where the call center employee needs to summarize the last call, the cost of the employee for creating this one summary in terms of salary might be lower than querying an LLM system like ChatGPT to do the same task. The computational cost of the querying depends on the input length given to the LLM system. By definition, in summarization, the LLM is provided with very long (or even multiple) documents. This is particularly useful for reducing the reading time and cognitive burden on a human, which is very high when humans need to read large amounts of text. Embodiments of the present invention enable to reduce this cognitive load with the use of improved AI technology. At the same time, embodiments of the present invention enable to significantly reduce the cost of using LLM systems, by reducing the computational load, thereby enabling to conserve computational resources and/or compute time. In particular, embodiments of the present invention provide to reduce the input length of the LLM query, and enable to even make it as short as possible.

Embodiments of the present invention provide solutions that address both of these shortcomings of existing technology jointly, and provide to reduce the input length in a secure and reliable manner before asking the LLM to generate a fluent summary.

In a first aspect, the present invention provides a computer-implemented, machine learning method for generating explainable text summaries includes extracting a subset of sentences from at least one input document as an extractive summary and adding context to the extracted sentences to generate a prompt. A fluent summary is generated by using the prompt as input to a generative language model. Source information for a sentence from the fluent summary is determined by mapping the sentence from the fluent summary to at least one sentence in the extractive summary and the at least one sentence from the extractive summary to at least one sentence from the at least one input document. A transparent summary view is generated showing the sentence from the fluent summary along with the source information from the extractive summary and the at least one input document for display on a user interface.

In a second aspect, the present invention provides the method according to the first aspect, wherein mapping the sentence from the fluent summary to the at least one sentence in the extractive summary and/or mapping the at least one sentence from the extractive summary to the at least one sentence from the at least one input document is performed using a natural language inference model that predicts for the mapping whether a respective one of the sentences is entailed by another one of the sentences.

In a third aspect, the present invention provides the method according to the first or second aspect, wherein mapping the sentence from the fluent summary to the at least one sentence in the extractive summary is performed by embedding the sentence from the fluent summary and each respective one of the extracted sentences as a numerical vector using a sentence embedding model, and selecting a number k of the extracted sentences that are nearest neighbors to the sentence from the fluent summary as evidence in the extractive summary.

In a fourth aspect, the present invention provides the method according to any of the first to third aspects, wherein mapping the at least one sentence from the extractive summary to the at least one sentence from the at least one input document is performed by embedding each respective one of the at least one sentence from the at least one input document as a numerical vector using a sentence embedding model, and selecting, as evidence in the input documents, a number k of the at least one sentence from the at least one input document that are nearest neighbors to the number k of the extracted sentences that are in the evidence in the extractive summary.

In a fifth aspect, the present invention provides the method according to any of the first to fourth aspects, further comprising removing meaningless words and phrases from the extracted sentences prior to generating the prompt.

In a sixth aspect, the present invention provides the method according to any of the first to fifth aspects, wherein the meaningless words and phrases are determined by comparing the extracted sentences to a database containing words and phrases that have been previously classified as meaningless.

In a seventh aspect, the present invention provides the method according to any of the first to sixth aspects, further comprising determining the subset of sentences using a neural network that receives the at least one input document and outputs an informativeness score for each sentence contained in the at least one input document.

In an eighth aspect, the present invention provides the method according to any of the first to seventh aspects, wherein adding the context to the extracted sentences includes resolving ambiguities in individual ones of the extracted sentences by performing co-reference resolution and entity linking based on the at least input document.

In a ninth aspect, the present invention provides the method according to any of the first to eighth aspects, further comprising checking whether one or more of the extracted sentences is a duplicate by semantically comparing embeddings of the extracted sentences using a similarity threshold, and excluding the one or more of the extracted sentences from the prompt based on a determination that the one or more of the extracted sentences is within the similarity threshold to another one of the extracted sentences.

In a tenth aspect, the present invention provides the method according to any of the first to ninth aspects, wherein the prompt comprises a list of the extracted sentences and, for respective ones of the extracted sentences having the added context, the added context is concatenated to the respective extracted sentence, and wherein the prompt further comprises an instruction to the generative language model to summarize, paraphrase or re-write the extracted sentences, which is output as the fluent summary.

In an eleventh aspect, the present invention provides the method according to any of the first to tenth aspects, wherein the transparent summary view highlights on the user interface the sentence from the fluent summary as well as the source information including the at least one sentence from the extractive summary and the at least one sentence from the at least one input document.

In a twelfth aspect, the present invention provides the method according to any of the first to eleventh aspects, wherein the at least one input document includes patient data, and wherein the transparent summary view is used to support decision-making in a medical Artificial Intelligence (AI) or automated healthcare use case.

In a thirteenth aspect, the present invention provides the method according to any of the first to twelfth aspects, wherein the at least one input document includes a criminal investigation report, and wherein the transparent summary view is used to support decision-making in a public safety use case and/or to activate a forensic tool.

In a fourteenth aspect, the present invention provides a computer system for generating text summaries comprising one or more processors which, alone or in combination, are configured to perform a machine learning method for generating explainable text summaries according to any of the first to thirteenth aspects.

In a fifteenth aspect, the present invention provides a tangible, non-transitory computer-readable medium for generating explainable text summaries containing instructions which, upon being executed by one or more hardware processors, provide for execution of a machine learning method according to any of the first to thirteenth aspects.

FIG. 1 schematically illustrates a method and overall system architecture 100 for generating text summaries in accordance with an embodiment of the present invention. At least one document is taken as (a) input 102. This is then passed to the (1) extractive summarizer 104. Next, the (1) extractive summarizer 104 selects a subset of sentences from the (a) input 102. Then, the (3) preprocessor 108 adds context to the extracted sentences and removes meaningless words and phrases to generate the prompt for the abstractive summarizer as a (c) preprocessed summary 110. The (2) abstractive summarizer 112 (which also could be an LLM) then takes the (c) preprocessed summary 110 as input and generates (d) fluent summary 114 as output. Finally, the (4) explainer 120 receives three different summaries ((b) extractive summary 106, (c) preprocessed summary 110, (d) fluent summary 114) for the (a) input 102 and generates a transparent summary view for another AI system and/or a user.

Thus, in total, the system according to an embodiment of the present invention creates three different summaries ((b) extractive summary 106, (c) preprocessed summary 110, (d) fluent summary 114) for the (a) input 102. Then, the (e) transparent summary view 125 links these four texts ((a) input 102, (b) extractive summary 106, (c) preprocessed summary 110, (d) fluent summary 114) together in a transparent and, therefore, secure, reliable and trustworthy manner. In Table 1 below, the advantages of the different summaries and input are provided:

TABLE 1

| Topic | (a) Input | (b) Extractive Summary | (c) Preprocessed Summary | (d) Fluent Summary |
|---|---|---|---|---|
| Low cognitive burden for humans | − | = | = | + |
| Low Time requirement for humans | − | = | = | + |
| Safe | + | + | − | − |
| Fluent | + | − | − | + |
| Short input for lowering LLM cost | − | + | + | n/a |

Extractive Summarizer:

The (1) extractive summarizer 104 is configured to extract informative textual units contained in the (a) input 102 so that the (2) abstractive summarizer 112 receives a reduced number of tokens while maintaining the same level of informativeness in the final (d) fluent summary 114. Moreover, giving only the extracted subset as input to the (2) abstractive summarizer 112 contributes to a more factually consistent summary with respect to the documents of (a) input 102.

The (1) extractive summarizer 104 receives the documents of (a) input 102 and outputs the (b) extractive summary 106, which is a part of the data contained in the documents of (a) input 102. For example, it is a collection of sentences, phrases, words, and subwords contained in documents of (a) input 102. The order between these units (e.g., sentences) can be defined to read them as natural documents.

One implementation of the (1) extractive summarizer 104, for example, could be a script that retrieves the first k sentences of each document in documents of (a) input 102, where k is a parameter of the (1) extractive summarizer 104. Another implementation is to use a neural network that receives the documents of (a) input 102 and outputs an informativeness score for each sentence in the documents of (a) input 102. If the informativeness score for a sentence is greater than a threshold m, the sentence is included in the (b) extractive summary 106. Here, m is a parameter of the (1) extractive summarizer 104. A neural network can be trained using the training data (D, L), where the label L represents the informativeness for each sentence s in document D of (a) input 102. Thus, given a document D consisting of text, the trained neural network tries to predict the label L.

Preprocessor.

Figure 2:
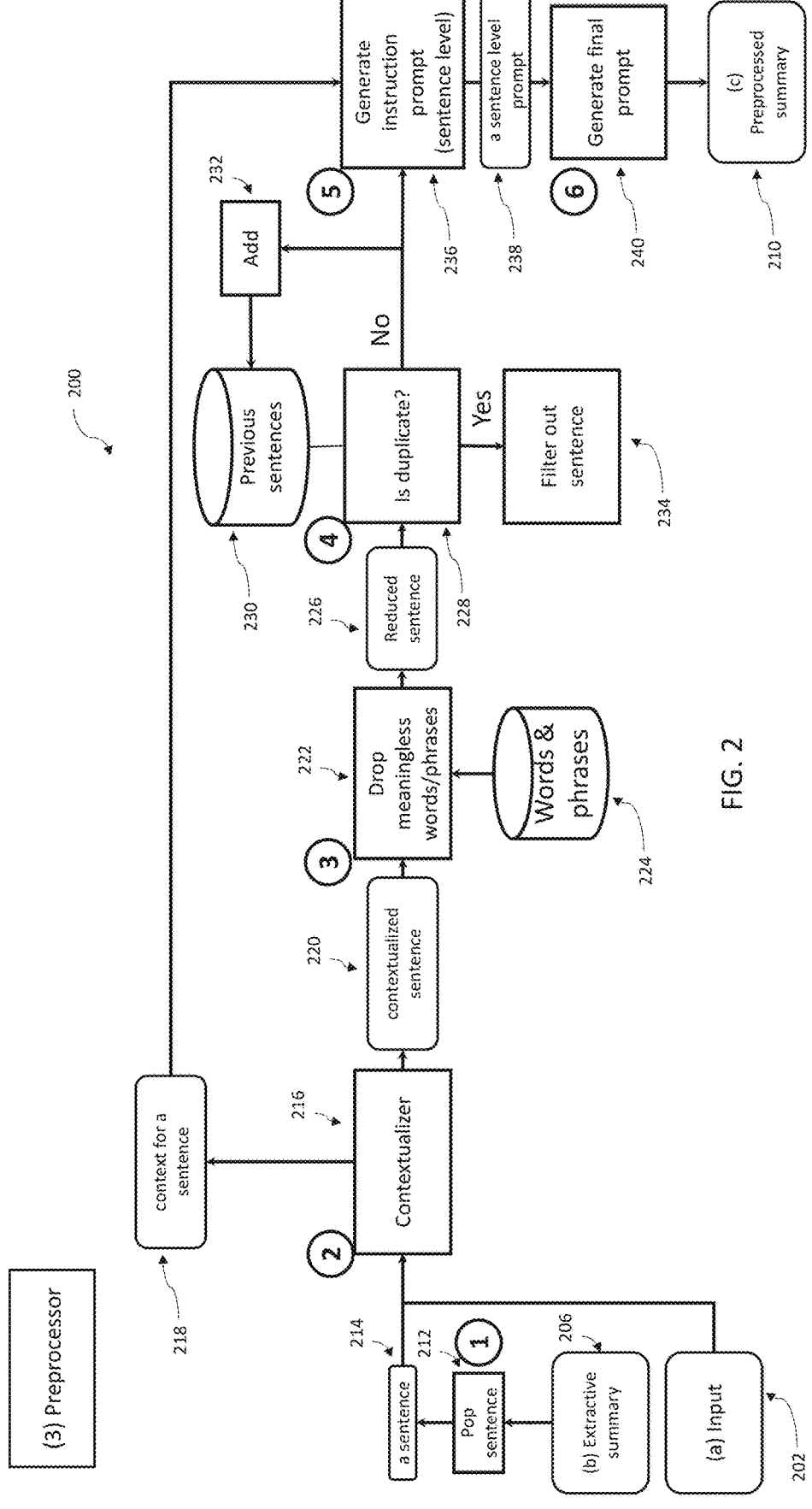
FIG. 2 schematically illustrates an overall architecture of a preprocessor, and steps performed by the preprocessor, in accordance with an embodiment of the present invention.

FIG. 2 schematically illustrates an overall architecture of a preprocessor 200, and steps performed by the preprocessor 200, in accordance with an embodiment of the present invention. The preprocessor 200 is configured to generate a prompt for the abstractive summarizer (e.g., an LLM system such as ChatGPT) such that (1) it reduces the number of tokens of the prompt to save the computational cost and inference time, and (2) adds context to extracted sentences in order to mitigate hallucinations of fact in the final summary. Instead of using the full original text as a prompt to the abstractive summarizer, the preprocessor 200 takes a (b) extractive summary 206 as an input (which is essentially a list of sentences), and it then returns a final prompt that is given to the abstractive summarizer in order to generate an abstractive and fluent summarization.

The preprocessor 200 takes the (b) extractive summary 206 as an input. The (b) extractive summary 206 consists of a list of sentences, which were selected and ranked by the extractive summarization module (see FIG. 1). These sentences are the original sentences from the original (a) input 202. Then, each sentence is investigated individually according to an embodiment of the present invention. The individual parts of the preprocessor according to an embodiment of the present invention are marked with numbers in the figure as follows:

(1) A module according to an embodiment of the present invention pops a sentence 214 from the list of sentences 212 in the extractive summary and adds it to a database of previous sentences. This is done for each sentence in the extractive summary.

Figure 3:
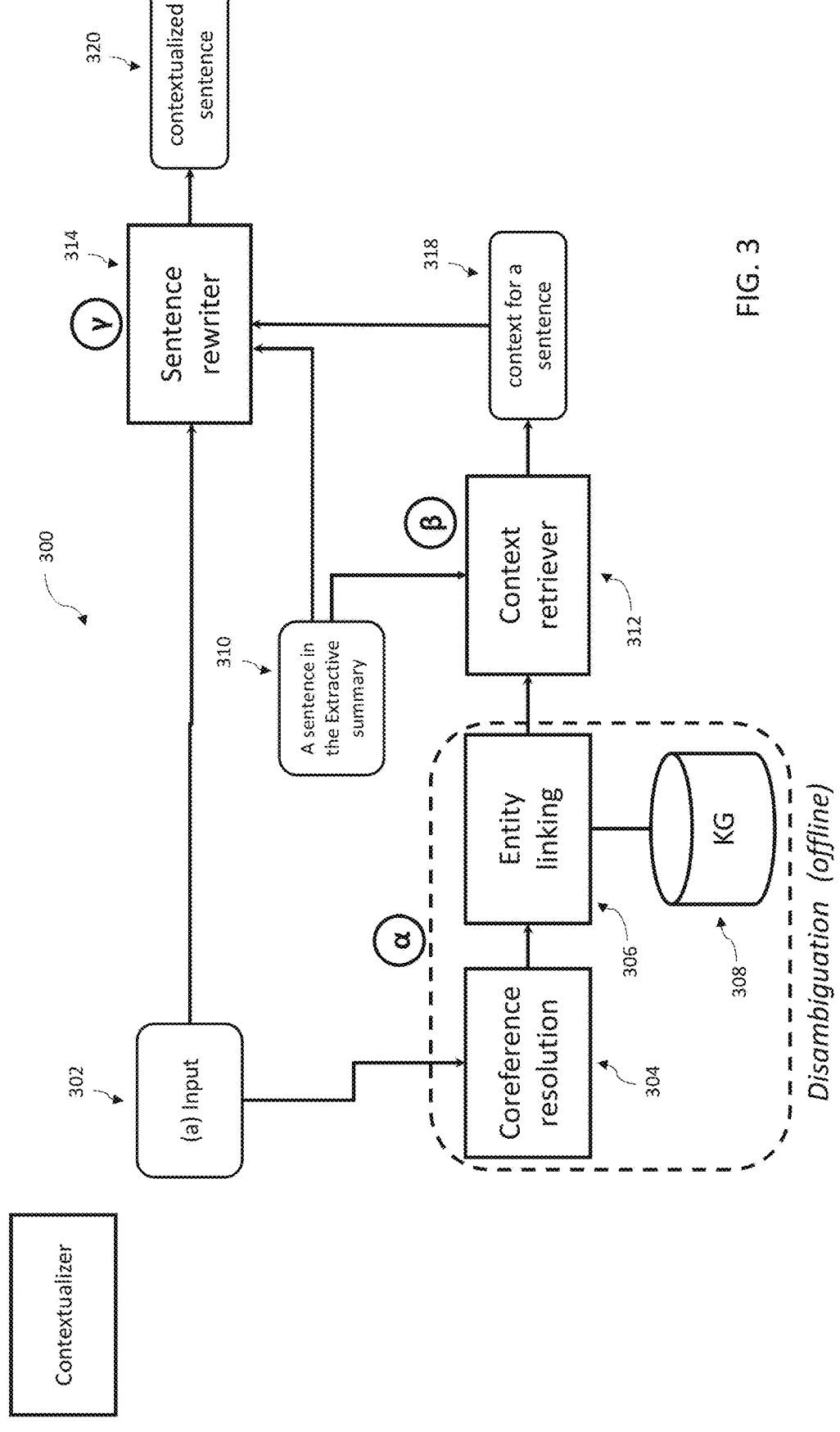
FIG. 3 schematically illustrates an overall architecture of a contextualizer, and steps performed by the contextualizer, in accordance with an embodiment of the present invention.

(2) The contextualizer 216 receives the document(s) of (a) input 202 and a sentence 214 from the (b) extractive summary 206, and generates an additional context for a sentence 218 so that the LLM can correctly understand the meaning of the sentence stand-alone. For example, the context could help resolving ambiguities with personal pronouns (e.g., "He" refers to "John F. Kennedy"). This component also converts the sentence 214 to the contextualized sentence 220, which can be interpreted without any context. A method and system architecture 300 of the contextualizer 216 according to an embodiment of the present invention is shown in FIG. 3 and includes parts marked with symbols in the figure as follows:

(α) The context comes from a co-reference resolution module 304 and entity linking 306, each of which are pretrained, connected to a knowledge graph (KG) database 308. These steps were done "offline" on the entire original document (or on the entire collection of documents if the input consists of multiple documents). Their context is used to resolve ambiguities, because many of the selected sentences from the summary will contain ambiguous terms. Such ambiguous terms could, for example, be personal pronouns, or names of places or people for which it is not clear what are they referring to (e.g., "John F. Kennedy" can refer both to the former late President of the US and to the airport in New York). For the co-reference resolution part, it is explained to what string this pronoun is referring to (e.g., in "He lived in Washington" the "He" refers to "John F. Kennedy") using a pretrained coreference resolution model. For the entity linking 306, the description of the entity is taken from a knowledge graph from the KG database 308 and added as an additional context (e.g., in "John F. Kennedy was crowded today", "John F. Kennedy" is an airport in New York). The entity linker 306 is pretrained to link to the knowledge graph for adding the additional context. All personal pronouns can be considered ambiguous, as well as nouns and entity names. Other ambiguous terms can be determined by looking into a database of strings. If one string has multiple meanings or entries (e.g., "bank" can be an institution, a building or a side of a river), then it can be considered to be an ambiguous term. Once the entity is resolved with respect to the reference knowledge graph, then the entity description can simply be retrieved from the knowledge graph (as this is information that most knowledge graphs have today).

(β) The context retriever 312 receives a sentence from the extractive summary 310 and the previously generated context. Then, it retrieves and outputs the context for the sentence 318 (e.g., retrieves a co-reference resolution phrase for a pronoun in a sentence). This step is done "online" only on the sentences from the extractive summary.

(γ) Finally, the sentence rewriter 314 receives the documents of (a) input 302, extracted sentence in the extracted summary 310 and context for the sentence 318, and converts them to the "contextualized" sentence 320 (contextualized sentence 220 in FIG. 2). The sentence rewriter 314 can be implemented by concatenating the context to the original sentence (e.g., in "He lived in Washington" the "He" refers to "John F. Kennedy"). Another implementation is to use a neural network which is trained to paraphrase a sentence. For example, this implementation can use a neural network that receives (s1, s2) pairs as input data, where s1 is an original sentence and s2 is the paraphrased sentence and is trained such that, given an input sentence s1, the model generates s2 such that it is different in terms of words being used, but has the same meaning as s1.

(3) The contextualized sentence 220 is passed to the dropping module according to an embodiment of the present invention. The dropping module drops words or phrases that are considered to be meaningless 222, in particular, words or phrases where if one is to remove them, it will not change the meaning of the original sentence, in order to produce a reduced sentence 226. The module could be, for example, a trained model or neural network that is trained to drop such meaningless words. Likewise, the module could, for example, be informed by an external database of words and phrases 224. In particular, whenever the module encounters certain words or phrases that are marked by the database 224 as meaningless (e.g., "still", "on the other hand", etc.), the module drops them. The database 224 can contain a list of words and phrases, including a predefined dictionary, that can be dropped, including conjunct adverbials (still, on the other hand, however, to sum up, in other words, etc.), articles (e.g., the, a) and irrelevant conjuncts (e.g., "The iphone costs $1000, but it's not worth it). Advantageously, embodiments of the present invention are agnostic with respect to the source of these words or phrases: they can come from a database, a recommender system, etc. The reduced sentence 226 is also added to the database of previous sentences 230.

(4) Next, a module according to an embodiment of the present invention checks if the current sentence is a semantic duplicate 228 with a previously processed sentence and, if so, filters out the sentence 226. This is achieved according to an embodiment of the present invention by using sentence embeddings to semantically compare two sentences. If the similarity is below a certain threshold, then the sentences are considered to be equivalent. If they are equivalent, then the currently considered sentence is dropped. Otherwise, the procedure continues, and the sentence is added 232 to the database of previous sentences 230. It is also possible to apply a consistency filter to recognize whether there is a contradiction in an original sentence, and if so, the sentence or contradiction can be filtered out as well.

(5) For each sentence, an instruction prompt is generated 236 to provide a sentence level prompt 238. When the abstractive summarizer is tuned to follow instructions (e.g., ChatGPT), the prompt consists of: (a) an instruction for the abstractive summarizer, and (b) each preprocessed sentence, as well as important context for it. The instruction for the abstractive summarizer is static and can be any prompt suggesting the abstractive summarizer to summarize the given text. For example, such prompt could be: "Rewrite the following text in a more fluent manner. Each sentence will be written on a new line. Each sentence will be written in double columns and will contain context for disambiguation after the sentence, separated by a tab. Example: "He lived in Washington"→"He" refers to "John F. Kennedy"". When the abstractive summarizer is not tuned to follow instructions (e.g., Bidirectional Auto-Regressive Transformers (BART)), the prompt consists of each preprocessed sentence only and a concatenation of them is used as the input document to the model.

(6) The general instruction for the LLM together with each sentence and its additional context are concatenated to generate the final prompt 240 for generating the (c) preprocessed summary 210.

Abstractive Summarizer:

Referring again now to FIG. 1, the (2) abstractive summarizer 112 receives the reduced (c) preprocessed summary 110 and outputs the (d) fluent summary 114. The (d) fluent summary 114 is the information contained in the reduced (c) preprocessed summary 110 transformed into a fluent and coherent document that is easy for the user to read. The content of the (d) fluent summary 114, which includes entities (e.g., names of people, organizations, and places), claims, and facts, must be included in the content of the reduced (c) preprocessed summary 110.

One implementation is to use a neural network that receives the reduced (c) preprocessed summary 110 and outputs a paraphrase of the content it contains as the (d) fluent summary 114. For example, by fine-tuning a pretrained language model with a summarization dataset, a summarizer can be obtained. Alternatively, a language model already trained on a generic task (e.g., ChatGPT) can be used. Given a reduced summary (c) and task instructions (e.g., "summarize the document"), it generates an abstract summary as the (d) fluent summary 114. The (2) abstractive summarizer 112 can be run via a web application processing interface (API) or via a local computing system.

Explainer:

The (4) explainer 120 is configured to trace the sentences in the final (d) fluent summary 114 back to the sentences in the original documents of (a) input 102 as well as in the (b) extractive summary 106. This component improves the explainability of the summarization system, since a user can easily confirm the source of a summary sentence and whether factually inconsistent information is included in a summary.

Figure 4:
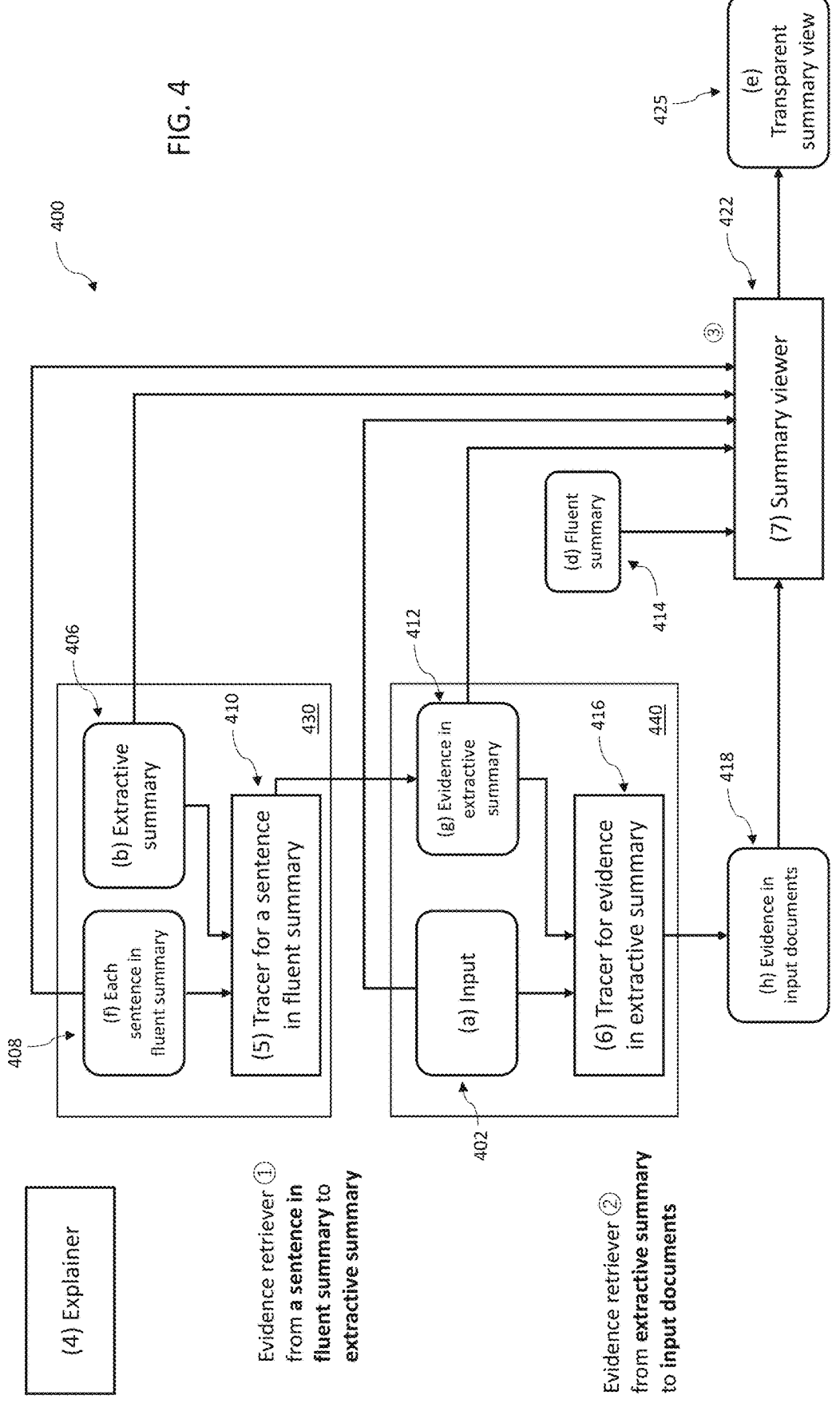
FIG. 4 schematically illustrates an overall architecture of an explainer, and steps performed by the explainer, in accordance with an embodiment of the present invention.
Figure 5:
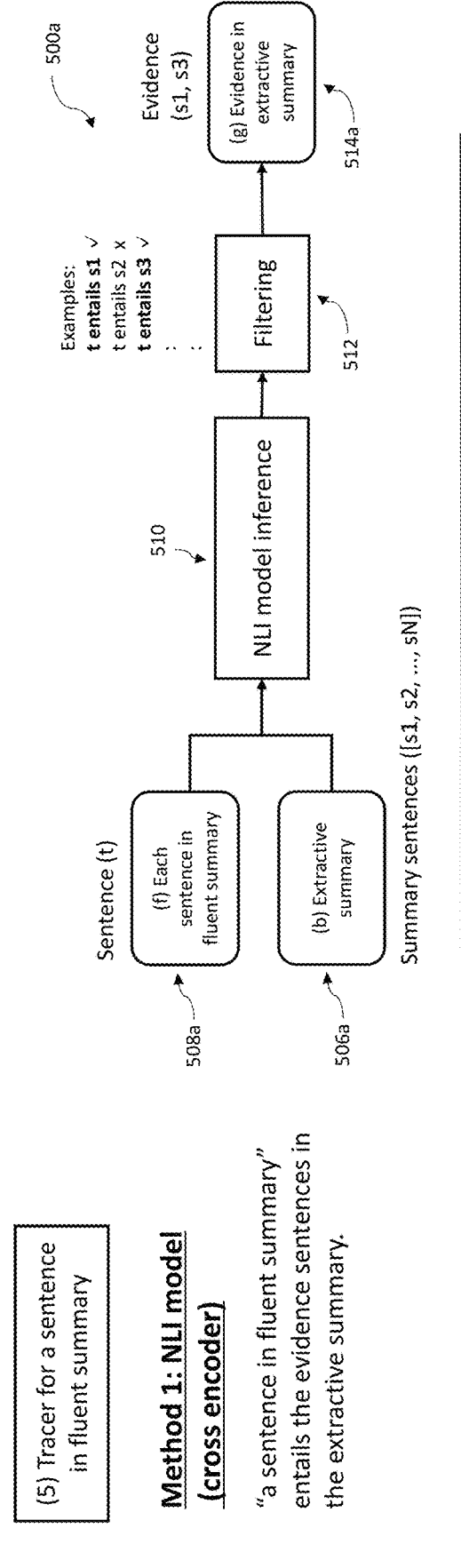
FIG. 5 schematically illustrates potential implementations of a tracer in accordance with an embodiment of the present invention.
Figure 5:
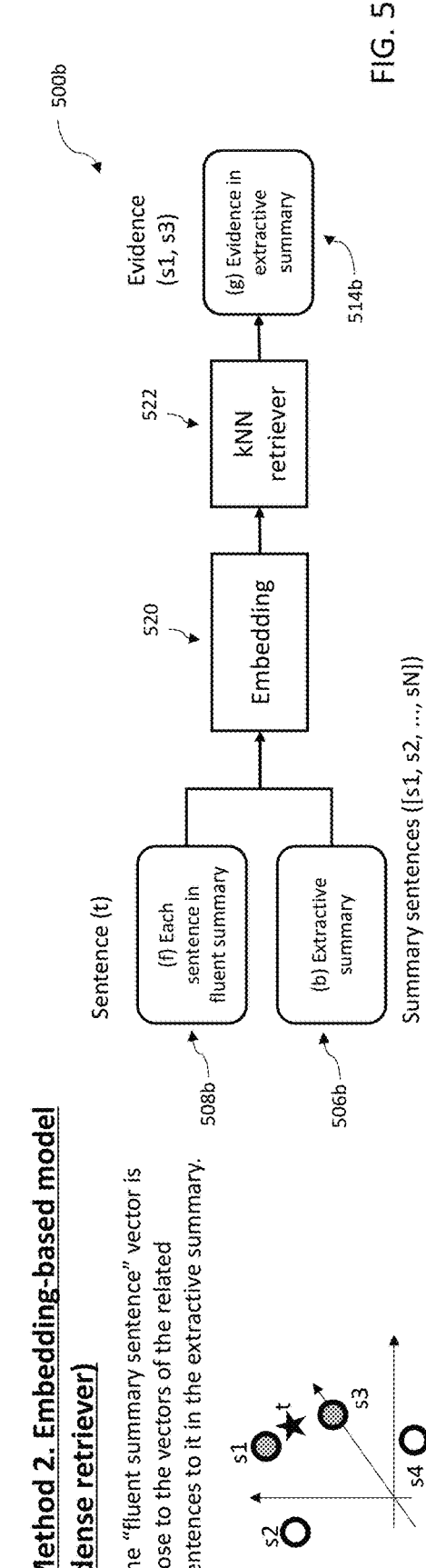

FIG. 4 schematically illustrates an overall architecture of an explainer 400 according to an embodiment of the present invention, and steps performed by the explainer 400, in accordance with an embodiment of the present invention. The explainer 400 receives the documents of (a) input 402, the (b) extractive summary 406, the (d) fluent summary 414, and (f) each sentence in the fluent summary 408. It outputs the (e) transparent summary view 425. The explainer 400 includes a first evidence retriever 430 with a (5) tracer for a sentence in fluent summary 410, and a second evidence retriever 440 with a (6) tracer for evidence in the extractive summary 416. The explainer 400 operates as follows:

(1) The (5) tracer for a sentence in fluent summary 410 receives (f) each sentence from the fluent summary 408 and the (b) extractive summary 406 and outputs the (g) evidence in the extractive summary 412, which evidence are textual units (e.g., sentences) contained in the (b) extractive summary 406 that are the source information of the sentence. FIG. 5 illustrates two possible implementations 500*a*, 500*b* of the (5) tracer for a sentence in fluent summary 410 as follows:

First implementation 500*a*: The (5) tracer for a sentence in fluent summary 410 is implemented with a natural language inference (NLI) model 510 that predicts whether the meaning of one text (hypothesis) is entailed by the meaning of another text (premise), for example using an existing NLI model that is so trained. For each sentence in the (b) extractive summary 506*a*, it is checked whether a sentence in the fluent summary 508*a* entails the sentence. Then, only the sentences that are predicted as "entailment" are filtered 512 and defined as the (g) evidence in the extractive summary 514*a*. Since in NLI, a task is determining whether a "hypothesis" is true (entailment), false (contradiction), or undetermined (neutral) given a "premise", NLI models are trained to determine entailment of the hypothesis. For example, considering the premise p="A soccer game with multiple males playing". Then, the following hypothesis is true: h="Some men are playing a sport". In this case, h is entailed by p.

Second implementation 500*b*: Alternatively or additionally, the (5) tracer for a sentence in fluent summary 410 can be implemented with a sentence embedding model (dense retriever), such as the SentenceBERT model, wherein each input sentence is represented as an n-dimensional vector. A sentence in the (f) fluent summary 508*b* and each sentence in the (b) extractive summary 506*b* are converted into numerical vectors that are embeddings 520 in a latent space. Then, the distance between the vector of the fluent summary sentence and the vector of an extractive summary sentence are computed in each case using a k-nearest neighbors (kNN) retriever 522. The sentences are ranked in decreasing order of distance and the top k closest sentences from the fluent summary sentence are retrieved and provided as the (g) evidence in the extractive summary 514*b*, where k is a parameter that can be learned or predetermined. The process is repeated also for each sentence in the (f) fluent summary 508*b*, providing embeddings of each sentence in the (f) fluent summery 508*b* and the (b) extractive summary 506*b*.

(2) The (6) tracer for evidence in the extractive summary 416 receives the (g) evidence in the extractive summary 412 and the documents in (a) input 402 and outputs the (h) evidence in the input documents 418, which evidence are textual units (e.g. sentences) contained in the documents of (a) input 402, which are the source information of the (g) evidence in the extractive summary 412. The (6) tracer for evidence in the extractive summary 416 can be implemented by the same methods used for the (5) tracer for a sentence in fluent summary 410. Thus, in the method for the (6) tracer for evidence in the extractive summary 416 relative to the method for the (5) tracer for a sentence in fluent summary 410, the sentences in the extractive summary that are output from the (5) tracer for a sentence in fluent summary 410 as (g) evidence in the extractive summary 412 takes the place of (f) each sentence in the fluent summary 402, and the (a) input documents 402 takes the place of the (b) extractive summary 406. Embeddings are therefore determined for each sentence in the (a) input documents 402.

Figure 6:
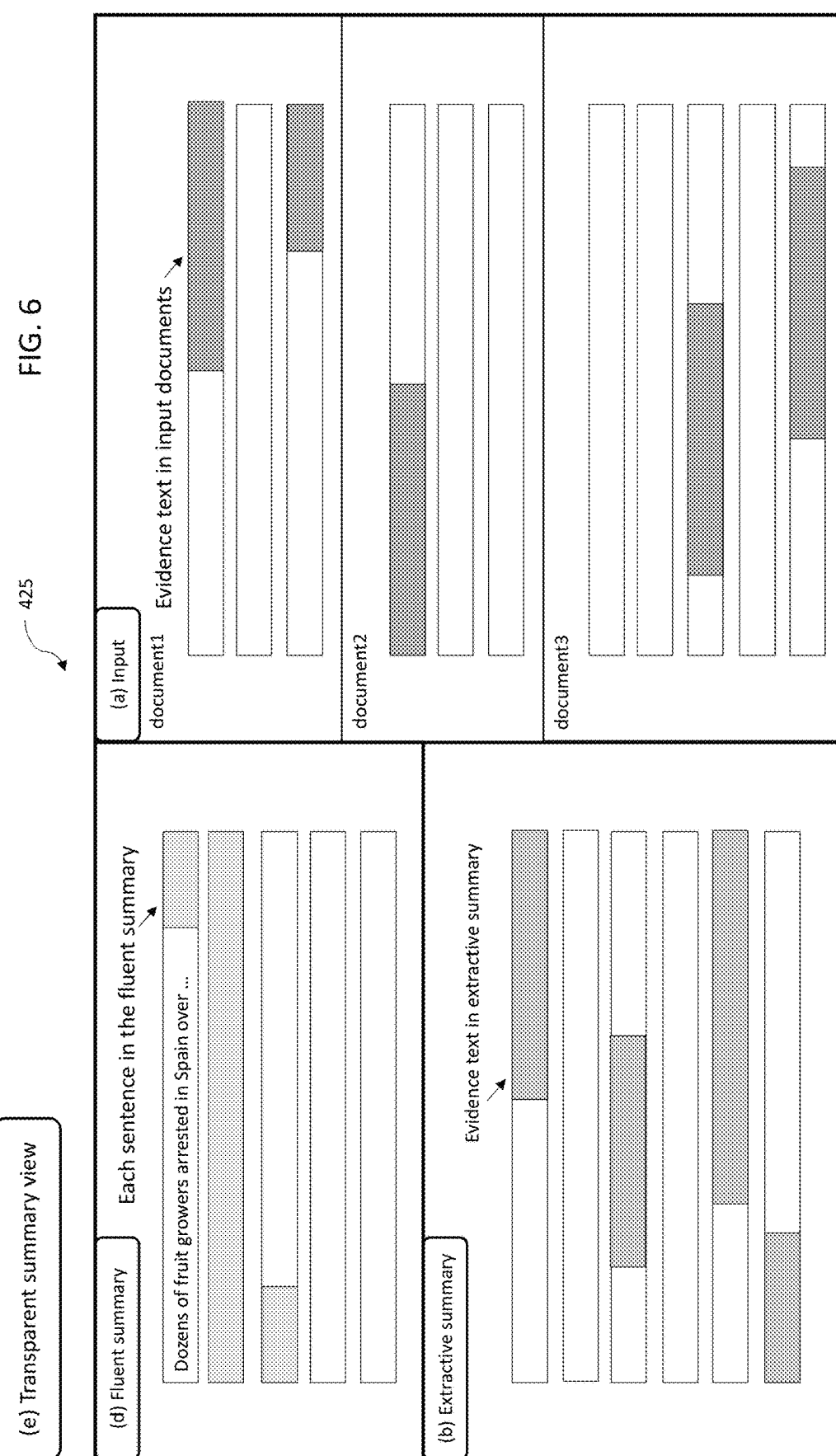
FIG. 6 shows an example of a transparent summary view in accordance with an embodiment of the present invention.

(3) The (7) summary viewer 422 receives the (d) fluent summary 414, (f) a sentence in the fluent summary 408, the (b) extractive summary 406, the (g) evidence in the extractive summary 412, the documents of (a) input 402, and the (h) evidence in the input documents 418. The (7) summary viewer 422 outputs the (e) transparent summary view 425, which highlights the fluent summary sentence and the source of information in the extractive summary and input documents. FIG. 6 illustrates an example of the (e) transparent summary view 425 including the (d) fluent summary having each sentence in the fluent summary, the (b) extractive summary including evidence text in the extractive summary and the documents of the (a) input including the evidence text in the input documents. Thus, a user can select an individual sentence from the fluent summary, and the evidence for that sentence is highlighted automatically within the extractive summary and input documents in the E transparent summary view 425.

Embodiments of the present invention can be practically applied to effect further improvements in a number of technical fields, such as medical AI, automated healthcare, AI assisted drug or material development, resource allocation and forensics.

In an embodiment, the present invention can be applied for summarization of patient diagnostics. Here, a use case could be, given doctor transcripts (from one or multiple medical doctors), to summarize the documents along with the final diagnosis of a patient. The data source (input) includes at least one document of doctor notes (from at least one doctor) about a patient with certain symptoms. The document(s) contains information about diagnosis as well as certain methods for treating the particular patient. Application of the method according to an embodiment of the present invention provides to shorten the input document(s) and create three levels of summaries: an extractive summary, a simplified summary, and a fluent summary. These summaries contain information about a patient diagnosis as well as the particular methods of how to treat the particular patient. These summaries are automatically highlighted for the doctors to inspect for safety.

In another embodiment, the present invention can be applied for summarization for knowledge work, for example for AI assisted drug development, contact center or consulting support, cyberthreat intelligence (CTI, e.g., for summarizing CTI reports), etc. Here, a use case could be, given at least one input document, generate three summaries at different levels of safety vs. fluency and lowered human cognitive burden. The data source (input) includes at least one document. Application of the method according to an embodiment of the present invention provides to shorten the input document(s) and creates three levels of summaries: an extractive summary, a simplified summary, and a fluent summary. The relations are traced between the summaries and to the original document(s). The output is three different summaries and a user interface that traces and highlights how the different summaries relate to each other and the original document(s). Actions can be taken in an automated or semi-automated fashion based on the summaries, which are used to support decision making. Also, the s1, s2 highlighted pair of sentences can also be used for computing factuality score, thus automatically estimating the faithfulness of the generated sentence in the fluent summary. This provides further information for the user, allowing to further increase trust in the AI system.

In another embodiment, the present invention can be applied for patient history summaries for medical AI or automated healthcare. Here, a use case could be, given at least one patient report from the patient's history (e.g., from Electronic Health Records (EHR)), produce a safe summary and explainer interface to the doctor. The data source (input) includes at least one patient report. Application of the method according to an embodiment of the present invention provides to shorten the input document(s) and create three levels of summaries: an extractive summary, a simplified summary, and a fluent summary. The relations are traced between the summaries and to the original document(s). The output is three different summaries and a user interface that traces and highlights how the different summaries relate to each other and the original document(s) and which gives a final summary of the patient's history on which a diagnosis can be made. Based on the report and/or the diagnosis, potential drugs or treatments could be generated in an automated or semi-automated manner.

In another embodiment, the present invention can be applied for a citizen report summary. Here, a use case could be, given at least one citizen report, produce a safe summary and explainer interface to a government worker (e.g., citizen could be seeking employment in an employment agency and government worker could be the citizen's case worker). This saves the time of the government worker and allows them to draw insights that the might have been missed otherwise. The data source (input) includes at least one citizen report. Application of the method according to an embodiment of the present invention provides to shorten the input document (s) and create three levels of summaries: an extractive summary, a simplified summary, and a fluent summary. The relations are traced between the summaries and to the original document(s). The output is three different summaries and a user interface that traces and highlights how the different summaries relate to each other and the original document(s) and which gives a final summary of the citizen's report based on which the government worker makes a decision. Based on the report, predictions for employment opportunities could be generated in an automated or semi-automated manner.

In another embodiment, the present invention can be applied for patent summarization. Here, a use case could be, given at least one patent or patent application, produce a safe summary and explainer interface. This saves the time of the patent reader and allows them to draw insights that the might have missed otherwise. The data source (input) includes at least one patent or patent application. Application of the method according to an embodiment of the present invention provides to shorten the input document(s) and create three levels of summaries: an extractive summary, a simplified summary, and a fluent summary. The relations are traced between the summaries and to the original document(s). The output is three different summaries and a user interface that traces and highlights how the different summaries relate to each other and the original document(s) and which gives a final summary of the patent or patent application to the user to make a final decision (e.g. whether the patent or patent application is relevant with regards to another patent).

In another embodiment, the present invention can be applied for suspect report summarization for automated forensic tools or public safety. Here, a use case could be, given at least one suspect report, produce a safe summary and explainer interface to a police worker. This saves the time of the police worker and allows them to draw insights that the might have missed otherwise. The data source (input) includes at least one suspect report. Application of the method according to an embodiment of the present invention provides to shorten the input document(s) and create three levels of summaries: an extractive summary, a simplified summary, and a fluent summary. The relations are traced between the summaries and to the original document (s). The output is three different summaries and a user interface that traces and highlights how the different summaries relate to each other and the original document(s) and which gives a final summary of the suspect's report based on which the police worker makes a decision. Based on the report, forensic tools could be activated in an automated or semi-automated manner.

In an embodiment, the present invention provides a method for creating summaries in a transparent, explainable and cost saving manner, the method comprising the steps of:

1) Choose a method for extractive summarization and implement it.

2) The extractive summarizer takes at least one document as input documents (a) and selects a subset of sentences from them.

3) The preprocessor adds context to the extracted sentences (b) and removes meaningless words and phrases to generate the prompt (c) for an abstractive summarizer (e.g., ChatGPT).

4) The abstractive summarizer takes the prompts (c) as input and generates fluent summary (d).

5) The explainer maps sentence from (d) to (b) and sentence from (b) to (a).

6) A user interface highlights how (a), (b) and (d) relate to each other.

Embodiments of the present invention enable the following improvements over existing technology:

1) Generating an abstractive summary (e.g., generated by an LLM) in a more secure, transparent and reliable manner by first employing an extractive summarizer and giving only the extracted subset as input to the abstractive summarizer (e.g., an LLM).

2) Reducing costs and computational resources required to generate the abstractive summary by further reducing unnecessary words in the extractive summary.

3) Increasing the efficiency, security, reliability and trustworthiness of a generative summarization by employing contextualizer (e.g., co-reference resolution), and helping to avoid hallucinations of fact. In contrast, feeding raw extracted text into an abstractive summarizer can cause hallucinations.

4) Increasing the efficiency, security, reliability and trustworthiness of a generative summarization by employing an explainer, which can trace from sentences in the final summary to the sentences in the original input, as well as in the intermediate representations (which are outputs of steps 2) and 3) of the above method).

Current technology of LLM systems such as ChatGPT are unsafe and expensive to use, especially with longer input query length. Embodiments of the present invention increase the safety of summarization, which is especially crucial for high risk domains, such as medicine and healthcare. Embodiments of the present invention also provide to reduce the cost because the computational costs of LLM usage increase with the increased input length, and embodiments of the present invention can be used to first safely reduce the input length.

Zhang, Haopeng, et. al., "Extractive Summarization via ChatGPT for Faithful Summary Generation," arXiv: 2304.04193 (2023), which is hereby incorporated by reference herein describe a summarization method with LLM in which they propose to adopt an extract-then-abstract strategy to improve factuality of the summary. However, in contrast to embodiments of the present invention, the summarization method does not (1) consider adding context for extracted sentence to mitigate hallucination nor (2) to equip the system to traceback from the summary to original documents.

Norkute, Milda, et. al., "Towards Explainable AI: Assessing the Usefulness and Impact of Added Explainability Features in Legal Document Summarization," CHI EA '21: Extended Abstracts of the 2021 CHI Conference on Human Factors in Computing Systems, Article No.: 53Pages 1-7 (May 2021), which is hereby incorporated by reference herein describe a traceback system, which is to directly traceback from a summary sentence to a sentence in original documents. However, this system is not efficient for memory because it needs to retrain the similarity scores for every pair of summary sentence and original document sentence. In contrast, embodiments of the present invention retain only the similarity scores between summary sentence and extracted sentence from original documents, thereby providing for computational improvements. This feature reduces the usage of memory and is especially beneficial when the length of the original documents is longer.

Choi, Eunsol, et. al., "Decontextualization: Making Sentences Stand-Alone," arXiv:2102.05169 (2021), which is hereby incorporated by reference herein, describe a technique for rewriting a sentence to be interpretable out of context, while preserving its meaning. However, the technique is not applied to extracted sentences in extract-then-abstract summarization system and does not mitigate hallucinations.

Figure 7:
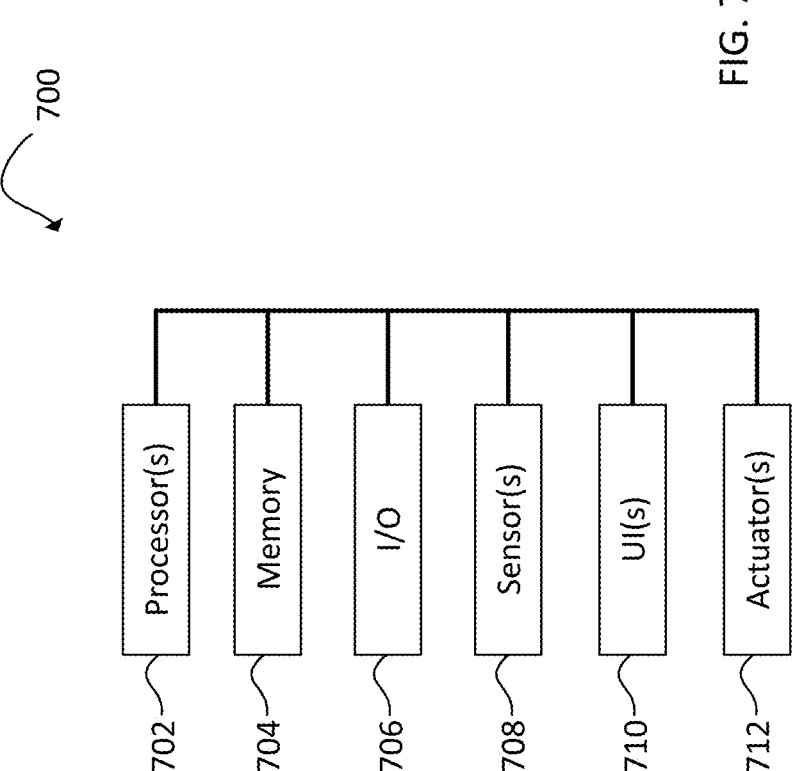
FIG. 7 is a block diagram of an exemplary processing system, which can be configured to perform any and all operations disclosed herein.

Referring to FIG. 7, a processing system 700 can include one or more processors 702, memory 704, one or more input/output devices 706, one or more sensors 708, one or more user interfaces 710, and one or more actuators 712.

Processing system 700 can be representative of each computing system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 700 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USB®, DisplayPort®, HDMI®, Ethernet, and the like. Input-output devices 706 can enable electronic, optical, magnetic, and holographic, communication with suitable memory 706. Input-output devices 706 can enable wireless communication via WiFi®, Bluetooth®, cellular (e.g., LTE®, CDMA®, GSM®, WiMax®, NFC®), GPS, and the like. Input-output devices 706 can include wired and/or wireless communication pathways.

Sensors 708 can capture physical measurements of environment and report the same to processors 702. User interface 710 can include displays, physical buttons, speakers, microphones, keyboards, and the like. Actuators 712 can enable processors 702 to control mechanical forces.

Processing system 700 can be distributed. For example, some components of processing system 700 can reside in a remote hosted network service (e.g., a cloud computing environment) while other components of processing system 700 can reside in a local computing system. Processing system 700 can have a modular design where certain modules include a plurality of the features/functions shown in FIG. 7. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented, machine learning method for generating explainable text summaries, the method comprising:

extracting a subset of sentences from at least one input document as an extractive summary;

adding context to the extracted sentences to generate a prompt;

generating a fluent summary by using the prompt as input to a generative language model;

determining source information for a sentence from the fluent summary by mapping the sentence from the fluent summary to at least one sentence in the extractive summary and the at least one sentence from the extractive summary to at least one sentence from the at least one input document; and generating a transparent summary view showing the sentence from the fluent summary along with the source information from the extractive summary and the at least one input document for display on a user interface, wherein mapping the sentence from the fluent summary to the at least one sentence in the extractive summary is performed by embedding the sentence from the fluent summary and each respective one of the extracted sentences as a numerical vector using a sentence embedding model, and selecting a number k of the extracted sentences that are nearest neighbors to the sentence from the fluent summary as evidence in the extractive summary.

2. The method according to claim 1, wherein mapping the sentence from the fluent summary to the at least one sentence in the extractive summary and/or mapping the at least one sentence from the extractive summary to the at least one sentence from the at least one input document is performed using a natural language inference model that predicts for the mapping whether a respective one of the sentences is entailed by another one of the sentences.

3. The method according to claim 1, wherein mapping the at least one sentence from the extractive summary to the at least one sentence from the at least one input document is performed by embedding each respective one of the at least one sentence from the at least one input document as a numerical vector using a sentence embedding model, and selecting, as evidence in the input documents, a number k of the at least one sentence from the at least one input document that are nearest neighbors to the number k of the extracted sentences that are in the evidence in the extractive summary.

4. The method according to claim 1, further comprising removing meaningless words and phrases from the extracted sentences prior to generating the prompt.

5. The method according to claim 4, wherein the meaningless words and phrases are determined by comparing the extracted sentences to a database containing words and phrases that have been previously classified as meaningless.

6. The method according to claim 1, further comprising determining the subset of sentences using a neural network that receives the at least one input document and outputs an informativeness score for each sentence contained in the at least one input document.

7. The method according to claim 1, wherein adding the context to the extracted sentences includes resolving ambiguities in individual ones of the extracted sentences by performing co-reference resolution and entity linking based on the at least input document.

8. The method according to claim 1, further comprising checking whether one or more of the extracted sentences is a duplicate by semantically comparing embeddings of the extracted sentences using a similarity threshold, and excluding the one or more of the extracted sentences from the prompt based on a determination that the one or more of the extracted sentences is within the similarity threshold to another one of the extracted sentences.

9. The method according to claim 1, wherein the prompt comprises a list of the extracted sentences and, for respective ones of the extracted sentences having the added context, the added context is concatenated to the respective extracted sentence, and wherein the prompt further comprises an instruction to the generative language model to summarize, paraphrase or re-write the extracted sentences, which is output as the fluent summary.

10. The method according to claim 1, wherein the transparent summary view highlights on the user interface the sentence from the fluent summary as well as the source information including the at least one sentence from the extractive summary and the at least one sentence from the at least one input document.

11. The method according to claim 1, wherein the at least one input document includes patient data, and wherein the transparent summary view is used to support decision-making in a medical Artificial Intelligence (AI) or automated healthcare use case.

12. The method according to claim 1, wherein the at least one input document includes a criminal investigation report, and wherein the transparent summary view is used to support decision-making in a public safety use case and/or to activate a forensic tool.

13. A computer system for generating text summaries comprising one or more processors which, alone or in combination, are configured to perform a machine learning method for generating explainable text summaries comprising the following steps:

extracting a subset of sentences from at least one input document as an extractive summary;

adding context to the extracted sentences to generate a prompt;

generating a fluent summary by using the prompt as input to a generative language model;

determining source information for a sentence from the fluent summary by mapping the sentence from the fluent summary to at least one sentence in the extractive summary and the at least one sentence from the extractive summary to at least one sentence from the at least one input document; and generating a transparent summary view showing the sentence from the fluent summary along with the source information from the extractive summary and the at least one input document for display on a user interface, wherein mapping the sentence from the fluent summary to the at least one sentence in the extractive summary is performed by embedding the sentence from the fluent summary and each respective one of the extracted sentences as a numerical vector using a sentence embedding model, and selecting a number k of the extracted sentences that are nearest neighbors to the sentence from the fluent summary as evidence in the extractive summary.

14. A tangible, non-transitory computer-readable medium for generating explainable text summaries containing instructions which, upon being executed by one or more hardware processors, provide for execution of a machine learning method comprising the following steps:

extracting a subset of sentences from at least one input document as an extractive summary;

adding context to the extracted sentences to generate a prompt;

generating a fluent summary by using the prompt as input to a generative language model;

determining source information for a sentence from the fluent summary by mapping the sentence from the fluent summary to at least one sentence in the extractive summary and the at least one sentence from the extractive summary to at least one sentence from the at least one input document; and generating a transparent summary view showing the sentence from the fluent summary along with the source information from the extractive summary and the at least one input document for display on a user interface, wherein mapping the sentence from the fluent summary to the at least one sentence in the extractive summary is performed by embedding the sentence from the fluent summary and each respective one of the extracted sentences as a numerical vector using a sentence embedding model, and selecting a number k of the extracted sentences that are nearest neighbors to the sentence from the fluent summary as evidence in the extractive summary.

* * * * *